Sept. 28, 1948.　　　　H. A. BLOHM　　　　2,450,229
OPHTHALMOLOGIST'S TOOL
Filed July 11, 1945

INVENTOR.
HERMAN AUGUST BLOHM
BY Edwin Leuisohn
ATTORNEY.

Patented Sept. 28, 1948

2,450,229

UNITED STATES PATENT OFFICE 2,450,229

OPHTHALMOLOGIST'S TOOL

Herman August Blohm, Washington, D. C.

Application July 11, 1945, Serial No. 604,368

4 Claims. (Cl. 81—3.6)

This invention relates to ophthalmologists' tools.

A primary object of the present invention is the provision of an ophthalmologist's tool, specifically a pair of pliers, which is well adapted to be used for holding, bending or adjusting various parts of ophthalmic frames or temples, in fitting the frame and/or its temples to the wearer.

The above and other objects of the invention, which might hereinafter appear, will be fully understood from the following description, considered in connection with the accompanying illustrative drawings.

Figures 2, 3:
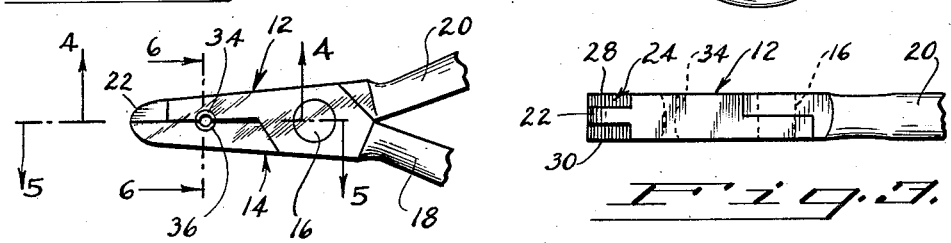
Fig. 2 is a side view of the forward part of the pliers.
Fig. 3 is a top view of Fig. 2.
Figure 4:
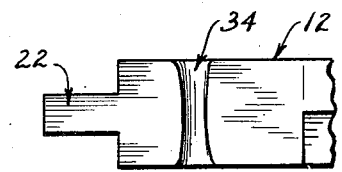
Figure 5:
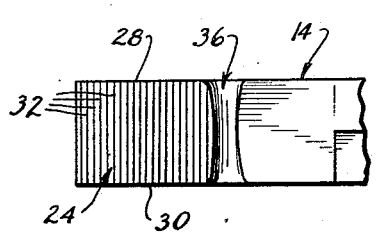
Figure 6:
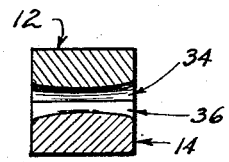

Figs. 4 and 5 are views of the companion jaws, respectively, of the pliers on the lines 4—4 and 5—5, respectively, of Fig. 2;

Fig. 6 is a sectional view, on a larger scale, on the line 6—6 of Fig. 2.

Figure 1:
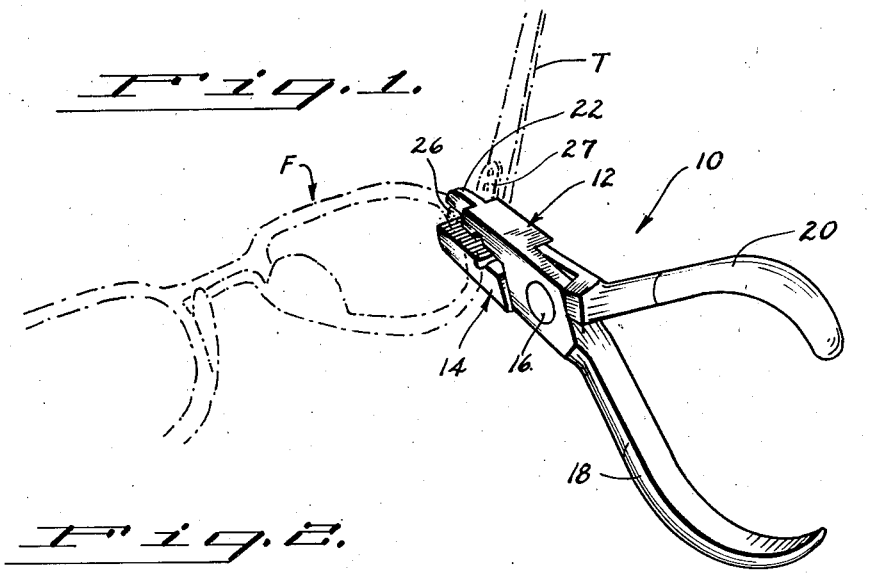
Fig. 1 is a perspective view of pliers embodying the present invention, and illustrating also one way of using said pliers.

Referring now to the drawings in detail, the pliers 10 embodying the present invention comprises the companion jaws 12 and 14 pivotally connected to each other in the usual way as by a pivot pin 16 and provided with integral handles 18 and 20, respectively. An important feature of the present invention resides in the construction and arrangement of the free or gripping end portions 22 and 24 of the companion jaws 12 and 14, respectively, of the pliers whereby to enable said jaws to grip the ophthalmic frame F, at the hinge part 26 thereof, securely but without scarring or marring the frame or the portions thereof which are gripped between the jaws of the pliers, and without marring or scarring the ornamental element frequently provided at the end of the frame near the temple T. As illustrated in Fig. 1 the pliers 10 are shown in gripping relation to the frame F whereby the hinge can be angled for adjustment purposes by moving the temple T while the gripping portions 22 and 24 of the pliers are held in secure engagement with the hinge part 26 and with the front of the adjacent end portion of the frame, respectively. For this purpose the gripping end portion of one of the jaws of the pliers, here shown as the gripping end portion 22 of the jaw 12, is substantially narrower than the gripping end portion 24 of the companion jaw 14. As clearly illustrated in the drawings, gripping end portion 22 of the jaw 12 is offset laterally inwardly from the opposite sides 28 and 30 of the gripping portion of jaw 14. This allows the pliers to be applied to the hinged portion of the frame or of the temple with the narrower gripping portion 22 clear of the hinge pin and with the gripping pressure of the companion jaws distributed over a comparatively wide area of the gripped end portion of the frame or temple, as the case may be. Further it will be noted that since gripping portion 22 is offset inwardly from both sides of the gripping portion 24 of jaw 12, the pliers can be applied to the end of the frame opposite to the end illustrated in Fig. 1 for adjusting the other temple or the hinge thereof. Also, it will be understood that instead of gripping the frame at the hinge part 26, the temple can be gripped at the companion hinge part 27. Preferably the inner surface of gripping portion 22 is smooth, and the confronting inner surface of the gripping portion 24 is provided with a plurality of shallow grooves 32 or can be otherwise roughened to improve the gripping action.

In accordance with another feature of the pliers of the present invention, the inner confronting surfaces of jaws 12 and 14 are provided with companion grooves 34, 36, respectively. Said grooves extend transversely of the companion jaws and are positioned in registry with each other when the inner surfaces of said jaws are in abutting surface to surface relation. Each of said grooves is of generally semi-cylindrical form but flare outwardly from the longitudinal median line of the pliers toward the opposite sides, respectively of the jaws, as clearly shown in Figs. 3 and 4. Also, as clearly illustrated in Fig. 6, said grooves preferably increase in depth progressively from said longitudinal median line toward the opposite sides, respectively, of the jaws. The jaws 12 and 14 thus provided with said grooves 34 and 36 are well adapted to grip and securely hold the temple, a longitudinally extending portion of the temple being positioned in said grooves and extending longitudinally thereof, to facilitate bending of the temple. More specifically, this feature of the invention is particularly useful in bending temples which are formed of shell, imitation shell, zylonite or other plastic, particularly plastic temples of modern construction which are provided with a longitudinally extending wire core or reinforcement. The tapering form of the grooves enables the temple to be securely gripped between the companion jaws of the pliers in said grooves without marring or scarring of the temple thus gripped between said jaws.

Having thus described my invention, what I claim and desire to secure by Letters Patent is:

1. A tool of the character described comprising a pair of pliers having companion gripping jaws pivotally connected to each other, one of said jaws having an outer end portion which is narrower than the outer end portion of the companion jaw, said first mentioned end portion being offset laterally inwardly of at least one side of the end portion of the companion jaw, said jaws having companion confronting grooves in their confronting surfaces disposed longitudinally inwardly of said end portions of the jaws and extending transversely of said jaws, said one of the jaws having a portion which is wider than said end portion thereof and, said last mentioned portion being provided with one of said grooves, said grooves having open ends at the adjacent sides of the jaws, said grooves increasing gradually in width from the longitudinal median line of the pliers to said open ends of the grooves.

2. A tool of the character described comprising a pair of pliers having companion gripping jaws pivotally connected to each other, one of said jaws having an outer end portion which is narrower than the outer end portion of the companion jaw, said first mentioned end portion being offset laterally inwardly of at least one side of the end portion of the companion jaw, said portions of said jaws having flat confronting gripping surfaces, said jaws having companion confronting grooves in their confronting surfaces disposed longitudinally inwardly of said end portions of the jaws and extending transversely of said jaws, said grooves having open ends at the adjacent sides of the jaws, said one of the jaws having a portion which is wider than said end portion thereof and, said last mentioned portion being provided with one of said grooves, said grooves increasing gradually in width and depth from the longitudinal median line of the pliers to said open ends of the grooves.

3. A tool of the character described comprising a pair of pliers having companion gripping jaws pivotally connected to each other, said jaws having companion confronting grooves in their confronting surfaces disposed longitudinally inwardly of the free ends of said jaws, said grooves extending transversely of said jaws and having open ends at the adjacent sides of the jaws, said grooves increasing gradually in width from the longitudinal median line of the pliers to said open ends of the grooves.

4. A tool of the character described comprising a pair of pliers having companion gripping jaws pivotally connected to each other, said jaws having companion confronting grooves in their confronting surfaces disposed longitudinally inwardly of the free ends of said jaws, said grooves extending transversely of said jaws and having open ends at the adjacent sides of the jaws, said grooves increasing gradually in width and depth from the longitudinal median line of the pliers to said open ends of the grooves.

HERMAN AUGUST BLOHM.

REFERENCES CITED

The following references are of record in the file of this patent:

UNITED STATES PATENTS

| Number | Name | Date |
| --- | --- | --- |
| 1,223,679 | Downs | Apr. 24, 1917 |
| 1,412,520 | Hansen | Apr. 11, 1922 |
| 1,420,988 | Foehl | June 27, 1922 |
| 1,638,078 | Bell | Aug. 9, 1927 |
| 1,753,080 | Zwilling | Apr. 1, 1930 |
| 2,301,445 | Ostertag | Nov. 10, 1942 |